United States Patent
Carrillo (10) Patent No.: US 10,094,194 B2
(45) Date of Patent: Oct. 9, 2018

(54) SUBSEA DRILLING SYSTEM WITH PRESSURE DAMPENER

(71) Applicant: Cameron International Corporation, Houston, TX (US)

(72) Inventor: Kody Carrillo, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/152,460

(22) Filed: May 11, 2016

(65) Prior Publication Data

US 2017/0328167 A1   Nov. 16, 2017

(51) Int. Cl.
| | |
|---|---|
| *F16L 55/04* | (2006.01) |
| *E21B 33/064* | (2006.01) |
| *E21B 33/035* | (2006.01) |
| *E21B 34/08* | (2006.01) |
| *F16L 55/053* | (2006.01) |

(52) U.S. Cl.
CPC ........ *E21B 33/064* (2013.01); *E21B 33/0355* (2013.01); *E21B 34/08* (2013.01); *F16L 55/053* (2013.01)

(58) Field of Classification Search
CPC ................................ F16L 55/053; F15B 1/24
USPC ...................................................... 138/30, 31
See application file for complete search history.

(56) References Cited

U.S. PATENT DOCUMENTS

| | | | | | |
|---|---|---|---|---|---|
| 1,975,483 | A | * | 10/1934 | Scott ......................... | F01N 1/20 138/31 |
| 2,828,760 | A | * | 4/1958 | Taylor ..................... | F15B 1/027 137/115.26 |
| 3,018,627 | A | * | 1/1962 | Perricci ................... | B64C 13/24 417/540 |
| 3,672,402 | A | * | 6/1972 | Bloemer ................... | F15B 1/02 138/31 |
| 5,219,000 | A | * | 6/1993 | Chalasani ................. | F15B 1/22 138/26 |
| 6,095,195 | A | * | 8/2000 | Park ....................... | F16L 55/053 138/30 |
| 6,266,959 | B1 | * | 7/2001 | Markwart ................. | F15B 1/24 60/414 |
| 8,656,959 | B2 | * | 2/2014 | Marin ....................... | F15B 1/04 138/30 |
| 2010/0206389 | A1 | * | 8/2010 | Kennedy ................... | F15B 1/24 137/14 |
| 2012/0085451 | A1 | * | 4/2012 | Poskie ..................... | F15B 1/04 138/31 |

* cited by examiner

*Primary Examiner* — Patrick F Brinson
(74) *Attorney, Agent, or Firm* — Helene Raybaud (57) ABSTRACT

A subsea drilling system with a subsea component controllable by a fluid supply source. The system includes a pressure dampener in fluid communication between the fluid supply source and the subsea component. The pressure dampener includes a body consisting of a dampener fluid flow path which consists of a volume and a biasing system. The biasing system includes a piston biased to an initial position, wherein the piston is configured to move from the initial position to expand the volume of the dampener fluid flow path and dampen a pressure surge received by the pressure dampener and wherein the biasing system is configured to contract the volume of the dampener fluid flow path by returning the piston toward the initial position after dampening the pressure surge.

22 Claims, 5 Drawing Sheets

SUBSEA DRILLING SYSTEM WITH PRESSURE DAMPENER

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Blowout preventers ("BOPs") are used to prevent blowouts during the drilling and production of oil and gas wells. BOPs are installed at the wellhead for the purpose of reducing the likelihood of an undesired escape of fluid from an annular space between the casing and drill pipe or from an open hole during drilling and completion operations.

BOPs are large, high-pressure valves capable of being remotely controlled. There are two basic types of BOPs, an annular-type BOP and a ram-type BOP. On floating offshore rigs, such as semisubmersibles and drill ships, BOPs may also be attached to the well on the seafloor. In such subsea applications, a plurality of BOPs may also be stacked on top of one another and referred to as a BOP stack.

A well control system monitors and controls the subsea BOPs from the drilling rig and one of the components of the system is a subsea control pod. The subsea control pod actuates and controls the subsea BOP stack with hydraulic fluid either from the drilling vessel or subsea actuators. The subsea control pods contain pilot operated control valves and pilot operated regulators which control flow of the hydraulic fluid to the various BOP hydraulic operators controlling the BOP functions.

When activating a BOP using a subsea control pod, pressurized hydraulic fluid is provided to the BOP through the valves and passages of the subsea control pods. Due to the high pressures of the hydraulic fluid, a pressure surge or wave caused from suddenly starting or stopping fluid flow, commonly referred to as fluid hammer or hydraulic shock, may reduce the life expectancy of the valves, hoses, and/or other components of the subsea control pods or other subsea equipment. Accordingly, reducing the effects of a fluid hammer, for example, will help to increase the life expectancy of subsea components, particularly in these remote locations where maintenance may be difficult.

BRIEF DESCRIPTION OF THE DRAWINGS

For a detailed description of the embodiments of the invention, reference will now be made to the accompanying drawings in which.

DETAILED DESCRIPTION

Figure 1:
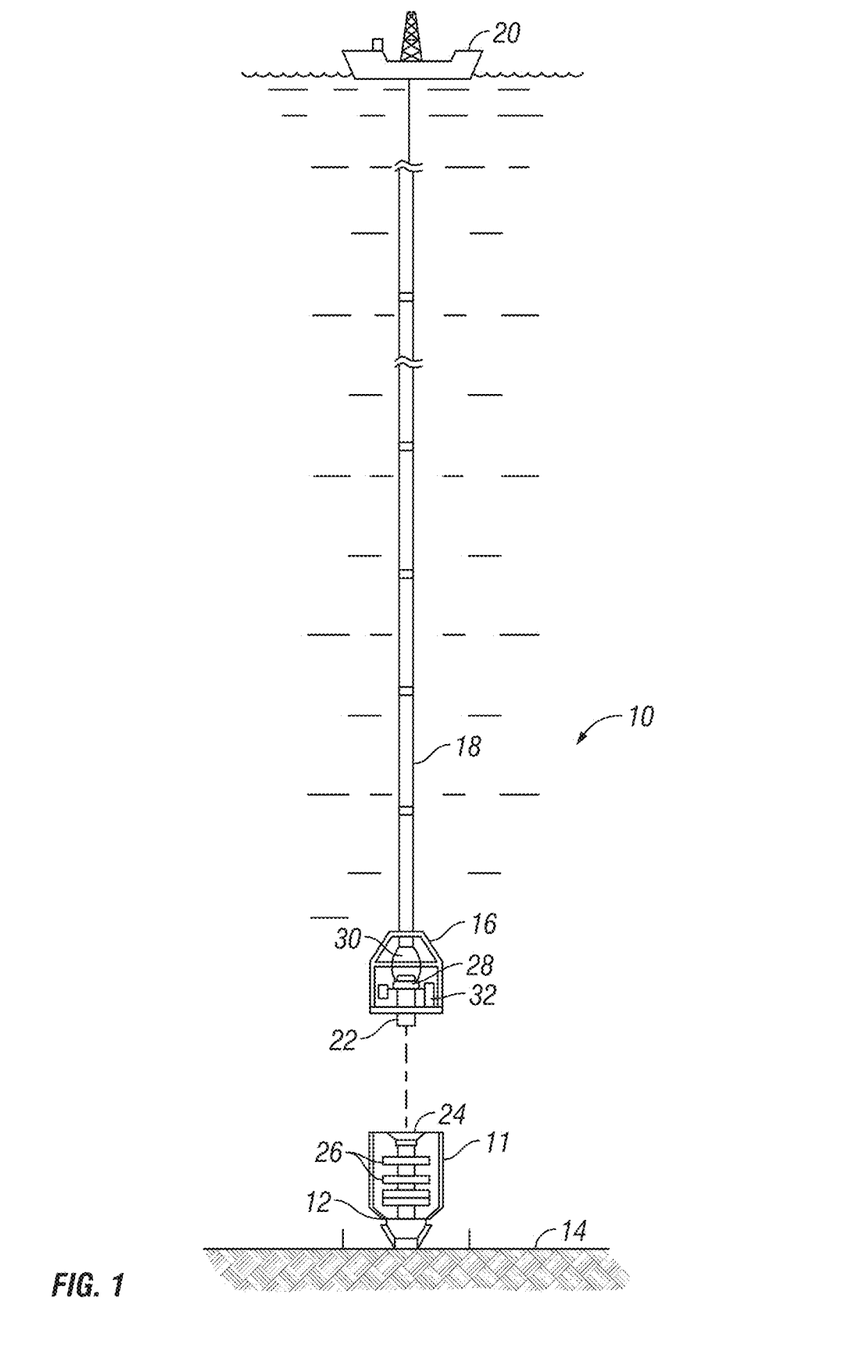
FIG. 1 depicts a diagram of an example subsea drilling system in accordance with one or more embodiments.

Referring now to FIG. 1, a diagram of an example subsea drilling system 10 in accordance with one or more embodiments is shown. As an example, the subsea drilling system may include a subsea blowout preventer ("BOP") stack 11 attached to a wellhead 12 upon the sea floor 14. A Lower Marine Riser Package ("LMRP") 16 may be attached to an end of a marine riser 18, extending from a drill ship 20 or any other type of surface drilling platform or vessel. The LMRP 16 may include a stinger 22 configured to engage a receptacle 24 located on an end of the BOP stack 11.

The BOP stack 11 may include (among other devices) a plurality of ram-type BOPs 26 useful in controlling the well during drilling and completion. The riser 18 provides a conduit through which drilling tools and fluids may be deployed to and retrieved from the subsea wellbore. The LMRP 16 may include (among other things) one or more ram-type BOPs 28, an annular-type BOP 30, and one or more subsea control pods 32. For example, two subsea control pods 32 may be included within the LMRP 16, which may be referred to as a blue pod and a yellow pod, such that redundancy may be provided for the subsea control pod 32. It should be appreciated that any number of control pods 32 may be used, such as, for example, three or more.

When desired or necessary, the ram-type BOPs of the LMRP 16 and the BOP stack 11 may be closed and the LMRP 16 may be detached from the BOP stack 11 and retrieved to the surface, leaving the BOP stack 11 atop the wellhead 12. Thus, for example, it may be necessary to retrieve the LMRP 16 from the BOP stack 11 and the wellhead 12, such as in times of inclement weather or when work is otherwise to be temporarily stopped. Also, the LMRP 16 may need to be raised for repairs and/or maintenance.

Figure 2:
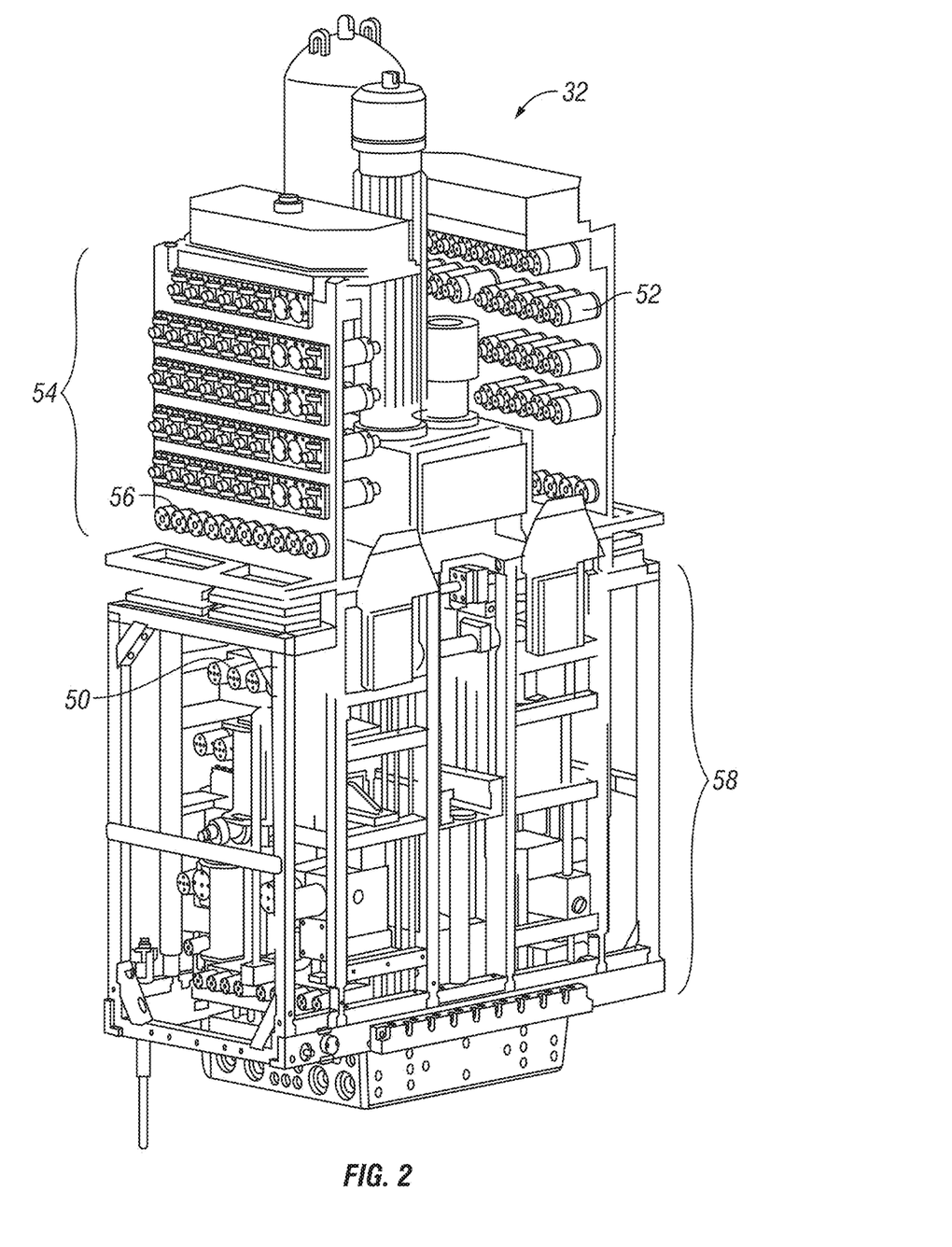
FIG. 2 depicts a perspective view of an example subsea drilling system in accordance with one or more embodiments.

Referring now to FIG. 2, a perspective view of a subsea control pod 32 in accordance with one or more embodiments is shown. The subsea control pod 32 may provide numerous functions to the BOP stack 11 and/or the LMRP 16. These functions may be initiated and/or controlled from or via the LMRP 16, such as controlled from the drill ship 20 or the surface through the LMRP 16. The subsea control pod 32 may be fixedly attached to a frame (not shown) of the LMRP 16 and may include one or more control valves 50, such as one or more sub-plate mounted ("SPM") valves that may be hydraulically activated, and one or more solenoid valves 52 that are fluidly connected to the hydraulically activated valves 50. The solenoid valves 52 may be provided in an electronic section 54 of the subsea control pod 32 and may be designed to be actuated by sending an electrical signal from an electronic control board thereto (not shown). Each solenoid valve 52 may be configured to activate a corresponding hydraulically activated valve 50. The subsea control pod 32 may include pressure sensors 56 also mounted in the electronic section 54. The hydraulically activated valves 50 may then be provided in a hydraulic section 58 of the subsea control pod 32.

For subsea blowout preventer installations, electrical cables and/or hydraulic lines may transport control signals from the subsea control pod 32 to the LMRP 16 and BOP stack 11 such that specified tasks may be controlled from the surface. Once the control signals are received, subsea control valves 50 and 52 are activated and high-pressure hydraulic lines are directed to perform the specified tasks. For example, when an electronic signal has been received subsea, the signal may activate one or more solenoid valves 52, which may in turn provide pilot opening pressure to activate and open one or more control valves 50. After the control valves 50 open, the hydraulic power fluid will flow through the pipe work and activate the BOP stack 11 to function, as desired. Thus, an electrical or a hydraulic signal may operate a plurality of "low-pressure" valves to actuate larger valves to communicate the high-pressure hydraulic lines with the various operating devices of the wellhead stack.

A bridge between the LMRP 16 and the BOP stack 11 may be formed that matches the multiple functions from the LMRP 16 to the BOP stack 11, such as to fluidly connect the control valves 50 from the subsea control pod 32 provided on the LMRP 16 to dedicated components on the BOP stack 11 or the LMRP 16. The subsea control pod 32 may be used in addition to choke and kill line connections (not shown) or lines that ensure pressure supply to, for example, the shearing function of the BOPs. Examples of communication lines that may be bridged between the LMRP 16 and the BOP stack 11 through feed-thru components may include, but are not limited to, hydraulic choke lines, hydraulic kill lines, hydraulic multiplex control lines, electrical multiplex control lines, electrical power lines, hydraulic power lines, mechanical power lines, mechanical control lines, electrical control lines, and/or sensor lines.

Accordingly, disclosed herein is a pressure dampener and a fluid system for a subsea drilling system that may include a pressure dampener. The drilling system includes a subsea component controllable by a fluid supply source and the pressure dampener is in fluid communication with and between the fluid supply source and the subsea component. The pressure dampener includes a dampener fluid flow path that elastically adjusts elastically (expand) (dynamically-restrained expansion) in response to a pressure surge received by the pressure dampener so as to at least partially dampen the pressure surge before being received by the subsea component.

Figure 3:
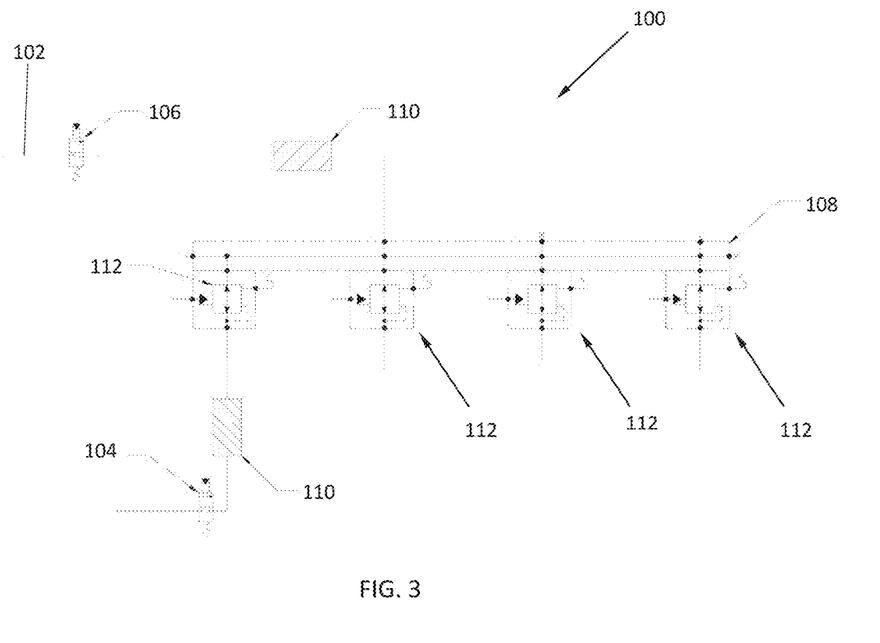
FIG. 3 shows a diagram of a fluid system for a subsea drilling system in accordance with one or more embodiments.

Referring now to FIG. 3, a diagram of a fluid system 100 for the control of a subsea component in accordance with one or more embodiments is shown. The fluid system 100 includes a fluid supply source line 102, such as a source of pressurized hydraulic fluid. The fluid system also includes a subsea component, such as a blowout preventer (BOP), with a function controllable by the fluid supply source through the use of a function control valve 104. For example, pressurized hydraulic fluid may be selectively provided to control the opening and/or closing of the BOP the rams, the elastomeric packing unit, wellhead connectors latch/unlatch, and/or any other components or functions of a BOP or other component.

FIG. 3 shows the supply source line 102 is blocked by a supply isolation valve 106 and downstream of the isolation valve 106 is a pressure dampener 110 (discussed in more detail below). The pressure dampener 110 may be used to dampen, relieve, or suppress pressure surges, such as fluid hammer or hydraulic shock, received within the fluid system 100. For example, when a fluid pressure surge or wave is introduced, the pressure dampener 110 may be used to dampen and relieve that pressure surge, preventing the pressure surge from damaging components within the fluid system 100 and/or downstream of the fluid system 100, such as the fluid control valve 104. Downstream of the pressure dampener 110 is a supply header 108. The pressure dampener 110 may be used to reduce the pressure surge at the inlet of the regulators 112 when opening the isolation valve under full operating pressure. Another pressure dampener 110 may also be installed downstream of the pressure regulators 112 before the function valve 104. This position allows the second pressure dampener 110 to dampen the surge from suddenly closing the function control valve 104 while flowing. Multiple function control valves 104 may also be supplied by a single regulator 112. Depending on how the function control valves 104 are installed in relation to the pressure dampeners 110, a single dampener 110 could reduce the pressure surge experienced for multiple functional control valves 104 in the circuit.

Figure 4:
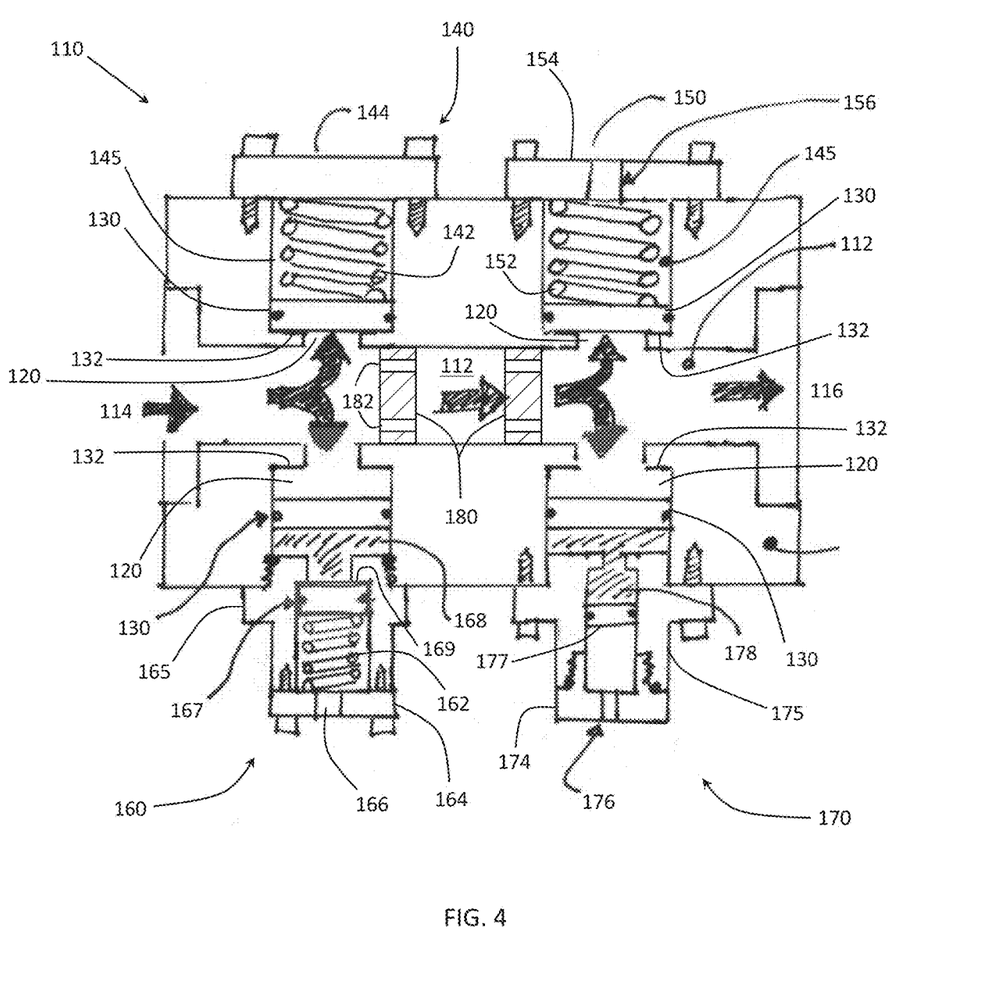
FIG. 4 depicts a cross section view of an example dampener, according to one or more embodiments.

With reference to FIG. 4, an example pressure dampener 110 is shown, in accordance with one or more embodiments. The pressure dampener 110 is connected in the flow path between a fluid supply source and a subsea component, such as fluid supply line 102 and function control valve 104 shown in FIG. 3. The pressure dampener 110 may be used to dampen, relieve, or suppress pressure surges, such as fluid hammer or hydraulic shock, received within the fluid system 100.

The pressure dampener 110 is an in-line fluid dampener and includes a body or housing 111 with a dampener fluid flow path 112 formed therethrough between an inlet 114 and an outlet 116. The pressure dampener 110 also includes one or more chambers 120 branched off of and in fluid communication with the flow path 112. Within each chamber 120 is a moveable piston 130 that is sealed against the wall of the chamber 120 and biased to an initial position as further discussed below. Each chamber 120 is thus an extension of the dampener fluid flow path 112 with a volume within the pressure dampener 110, the size of which is adjustable based on the position of each piston 130.

The position of each piston 130, and thus the volume of the dampener fluid flow path 112 is controlled and thus configured to expand in response to a pressure surge received by the pressure dampener 110 so as to at least partially dampen the pressure surge before being received by the subsea component. The adjustment of the position of each piston 130 can be controlled by any one or more embodiments of biasing devices or systems. In general, the resistance of the movement of a piston 130 may be achieved through the use of any one or more of: mechanical springs, compressible gas charge, fixed restricted orifice, variable restricted orifice, hydraulic pressure, and hydraulic pressure intensification, and deinstensification. Each piston 130 is biased by some means against a shoulder 132 that is either machined into or attached to the body 111.

As shown in FIG. 4, a biasing system 140 for a piston 130 includes a mechanical spring 142 compressible against a member 144 bolted or otherwise attached to the fluid dampener body 111. For example, the member 144 may also be screwed into the body 111. The member 144 seals against the body 111 to form a closed chamber 145 between the piston 130 and the member 144. The mechanical spring 142 may be any type of mechanical spring with any spring constant.

Upon the occurrence of a sufficient pressure surge, pressure in the dampener fluid flow path 112 moves the piston 130 from an initial position to an expanded position, compressing the spring 142 and the fluid in the closed chamber 145. Movement of the piston 130 to the expanded position expands the volume of the dampener fluid flow path 112 and dampens the pressure surge. Upon relief of the pressure surge, the spring 142 and the compressed fluid in the chamber 145 expand to return the piston 130 towards the initial position.

As shown in FIG. 4, another embodiment of a biasing system 150 similarly includes a spring 152 and a member 154 connected to the body 111. However, the member 154 includes an orifice 156 open to the atmosphere, which may be fixed or variable. Thus, in this embodiment, the member 154 does not form a closed chamber with the piston 130. However, the orifice 156 does restrict fluid flow out of the space behind the piston 130, aiding the spring 152 in dampening the movement the piston 130. The orifice 156 being open to the atmosphere further allows for pressure compensation as the pressure dampener 110 is subjected to changing ambient pressures, such as being located subsea. The deeper subsea the pressure dampener 110 is located, the higher the ambient pressure acting through the orifice 156 against the back side of the piston 130, thus increasing the resistance against the piston 130 moving to an expanded position.

Upon the occurrence of a sufficient pressure surge, pressure in the dampener fluid flow path 112 moves the piston 130 from an initial position to an expanded position, compressing the spring 152. Compression of the spring 152 resists movement of the piston 130 to an expanded position. Although not a closed chamber, movement of fluid through the orifice 156 is restricted and thus may also cause resistance to the movement of the piston 130. Additionally, ambient pressure acting on the piston 130 through the orifice 156 may resist movement of the piston 130 to an expanded position. Upon relief of the pressure surge, the compressed spring 152 expands and, along with any sufficient pressure acting on the piston 130 through the orifice 156, returns the piston 130 towards the initial position.

As shown in FIG. 4, another embodiment of a biasing system 160 includes the use of both a spring 162 and a gas to resist the movement of the piston 130 to an expanded position. The biasing system 160 is a cartridge-style system with a cartridge body 165 threaded into or otherwise attached to the pressure dampener body 111. A member 164 is bolted or otherwise attached to the end of the cartridge body 165. Sealed in between the piston 130 and an intermediate piston 167 is a gas charge 168 that is compressed as the piston 130 and the intermediate piston 167 move toward each other, resisting such movement. In addition to the gas charge 168, a second spring (not shown) may be included to act between the piston 130 and the intermediate piston 167. The spring 162 and the gas charge 168 may also be located on different sides of the intermediate piston 167. The biasing system 160 also includes an intermediate piston 167 biased against a cartridge shoulder 169 by the spring 162 compressible between the intermediate piston 167 and the member 164. Optionally, the member 164 includes an orifice 166. As with the biasing system 150, the orifice 166 restricts fluid flow across the member 164 and is open to the ambient pressure to allow for pressure compensation. The orifice 166 is optional though and need not be included.

Upon the occurrence of a sufficient pressure surge, pressure in the dampener fluid flow path 112 moves the piston 130 from an initial position to an expanded position, compressing the gas charge 168 between the piston 130 and the intermediate piston 167, which may cause the intermediate piston 167 to move and compress the spring 162. Compression of the gas charge 168 and the spring 162 resists the movement of the piston 130 to the expanded position. Although not a closed chamber, movement of fluid through the orifice 166 is restricted and thus may also resist the movement of the piston 130. Additionally, ambient pressure acting on the piston 167 through the orifice 166 may restrict movement of the piston 167 and thus the piston 130. Upon relief of the pressure surge, the compressed spring 162 and compressed gas charge 168 expand and, along with any sufficient pressure acting on the piston 130 through the orifice 166, return the piston 130 towards the initial position.

As shown in FIG. 4, another embodiment of a biasing system 170 includes the use of a gas charge 178 to resist the movement of the piston 130 to an expanded position. The biasing system 170 is a cartridge-style system with a cartridge body 175 threaded into or otherwise attached to the pressure dampener body 111. A member 174 is bolted or otherwise attached to the end of the cartridge body 175. Sealed in between the piston 130 and an intermediate piston 177 is a gas charge 178 that is compressed as the piston 130 and the intermediate piston 177 move toward each other, resisting such movement. In addition to the gas charge 178, a spring (not shown) may be included to act between the piston 130 and the intermediate piston 177. Optionally, the member 174 includes an orifice 176. As with the biasing system 150, the orifice 176 restricts fluid flow across the member 174 and is open to the ambient pressure to allow for pressure compensation. The orifice 176 is optional though and need not be included.

Upon the occurrence of a sufficient pressure surge, pressure in the dampener fluid flow path 112 moves the piston 130 from an initial position to an expanded position, compressing the gas charge 178 between the piston 130 and the intermediate piston 177, which may cause the intermediate piston 177 to move unless otherwise restrained by ambient pressure acting through the orifice 176 or until contacting the member 174. Compression of the gas charge 178 resists the movement of the piston 130 to the expanded position. Although not a closed chamber, movement of fluid through the orifice 176 is restricted and thus may also resist the movement of the piston 130. Additionally, ambient pressure acting on the piston 177 through the orifice 176 may restrict movement of the piston 130. Upon relief of the pressure surge, the compressed gas charge 178 expands and, along with any sufficient pressure acting on the piston 177 through the orifice 176, returns the piston 130 towards the initial position.

Optionally, the pressure dampener 110 may also include one or more baffles 180 in the flow path 112. Each baffle 180 includes one or more passages 182 for the flow of fluid along the flow path 112. However, the remaining portion of the baffle 180 is solid and blocks the flow of fluid. In this configuration, the baffle 180 restrains fluid flow through the baffle 180 and absorbs at least some of the force from the pressure surge, thus dampening the amplitude of the pressure surge passing through the baffle 180.

Fluid having hydraulic vibration may have an un-dampened amplitude when entering the pressure dampener 110 through the inlet 114. As the fluid then flows along the flow path 112, the pressure dampener 110 reduces and dampens the amplitude of the pressure surge or vibration, thereby enabling the fluid to have a significantly reduce and dampened amplitude when exiting the pressure dampener 110 through the outlet 116. As such, the pressure dampener 110 may provide fluid pressure amplitude suppressing capabilities.

Figure 5:
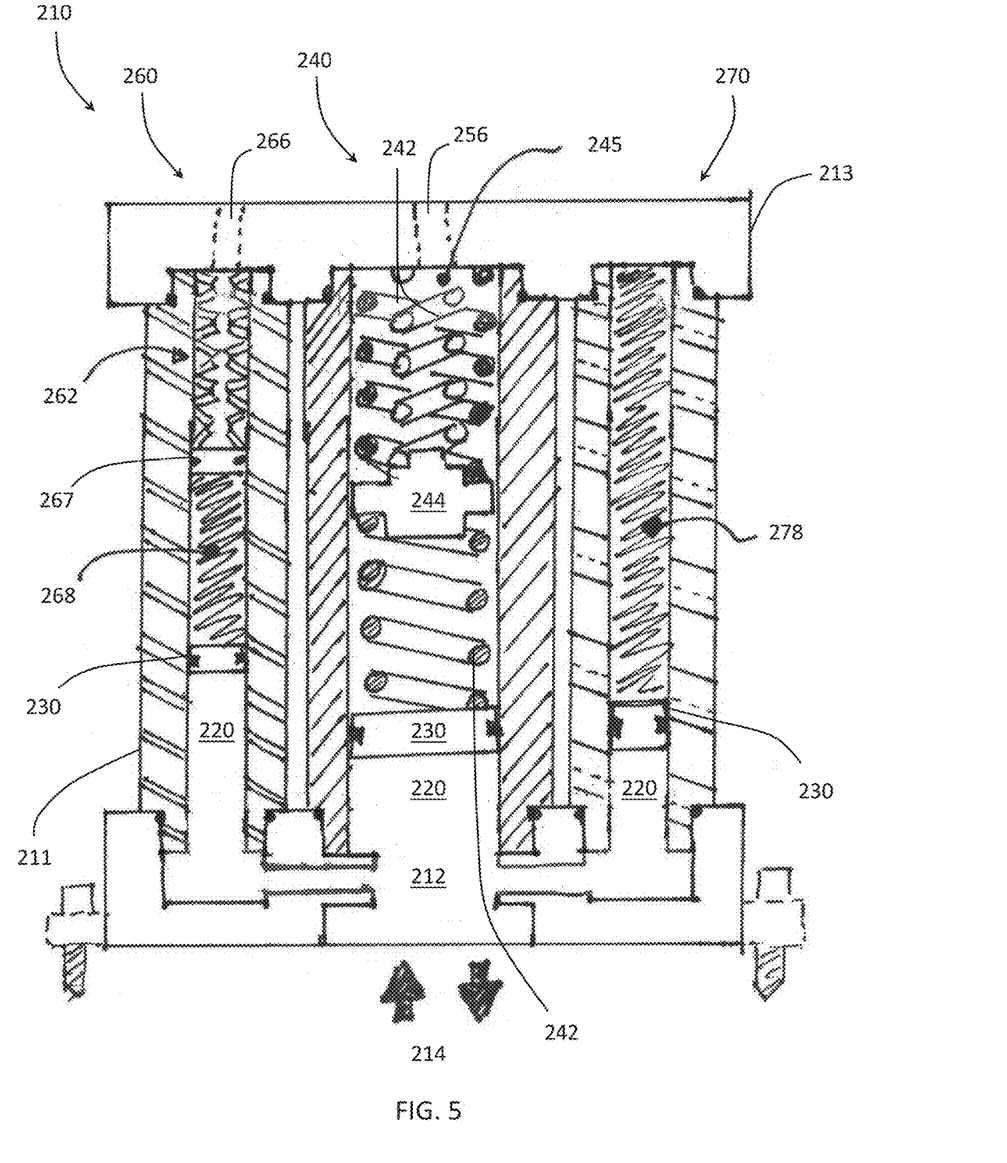
FIG. 5 depicts a cross section view of another an example dampener, according to one or more embodiments.

FIG. 5 depicts a cross-sectional view of an alternative embodiment of a pressure dampener 210 in accordance with one or more embodiments. As with the pressure dampener 110, the pressure dampener 210 is connected in the flow path between a fluid supply source and a subsea component, such as fluid supply line 102 and function control valve 104 shown in FIG. 3. The pressure dampener 210 may be used to dampen, relieve, or suppress pressure surges, such as fluid hammer or hydraulic shock, received within the fluid system 100.

The pressure dampener 210 includes a body or housing 211 with a support 213 and a dampener fluid flow path 212 formed within. The support 213 may be separate and attached to the remainder of the body 211 or may be integral therewith. Unlike the pressure dampener 110, the pressure dampener 210 is teed rather than in-line and includes an inlet 214 that is also an outlet. The pressure dampener 210 includes one or more chambers 220 branched off of and in fluid communication with the flow path 212. Within each chamber 220 is a biasing system than includes a moveable piston 230 that is sealed against the wall of the chamber 220 and biased to an initial position as further discussed below. Each chamber 220 is thus an extension of the dampener fluid flow path 212 with a volume within the pressure dampener 210, the size of which is adjustable based on the position of each piston 230.

The position of each piston 230, and thus the volume of the dampener fluid flow path 212 is controlled and thus configured to expand in response to a pressure surge received by the pressure dampener 210 so as to at least partially dampen the pressure surge before being received by the subsea component. The adjustment of the position of each piston 230 can be controlled by any one or more embodiments of biasing devices or systems. In general, the resistance of the movement of a piston 230 may be achieved through the use of any one or more of: mechanical springs, compressible gas charge, fixed restricted orifice, variable restricted orifice, hydraulic pressure, and hydraulic pressure intensification, and deinstensification.

As shown in FIG. 5, a biasing system 240 for a piston 230 includes a mechanical spring 242, an intermediate piston 244, and one or more additional mechanical springs 242. The mechanical spring 242 between the piston 230 and the intermediate piston 244 is compressible by movement of the piston 230 and intermediate piston 244 toward each other. The mechanical springs 242 between the intermediate piston 244 and the housing 211 are compressible as the intermediate piston 244 moves toward the support 213. The mechanical springs 242 may be of the same or different materials, lengths, dimensions, and spring constants as appropriate for the application.

The chamber 245 between the piston 230 and the support 213 may be a closed chamber or, alternatively, the support 213 may include an orifice 256 open to the atmosphere, which may be fixed or variable. If the orifice 256 is included, the chamber 245 is not closed. However, the orifice 256 does restrict fluid flow out of the chamber 245, aiding the springs 242 in dampening the movement the piston 230. The orifice 256 being open to the atmosphere further allows for pressure compensation as the pressure dampener 210 is subjected to changing ambient pressures, such as being located subsea. The deeper subsea the pressure dampener 210 is located, the higher the ambient pressure acting through the orifice 256 against the back side of the piston 230, thus increasing the resistance against the piston 230 moving to an expanded position.

Upon the occurrence of a sufficient pressure surge, pressure in the dampener fluid flow path 212 moves the piston 230 from an initial position to an expanded position, compressing the springs 242 and the fluid in the closed chamber 245. Movement of the piston 230 to the expanded position expands the volume of the dampener fluid flow path 212 and dampens the pressure surge. Upon relief of the pressure surge, the spring 242 and the compressed fluid in the chamber 245 expand to return the piston 230 towards the initial position.

If an orifice 256 is included, movement of fluid through the orifice 256 is restricted and thus may also cause resistance to the movement of the piston 230. Additionally, ambient pressure acting on the piston 230 through the orifice 256 may resist movement of the piston 230 to an expanded position. Upon relief of the pressure surge, any sufficient pressure acting on the piston 230 through the orifice 256, assists the springs 242 in returning the piston 230 towards the initial position.

As shown in FIG. 5, another embodiment of a biasing system 260 includes the use of both a spring 262 and a gas charge 268 to resist the movement of the piston 230 to an expanded position. Sealed in between the piston 230 and an intermediate piston 267 is a gas charge 268 that is compressed as the piston 230 and the intermediate piston 267 move toward each other, resisting such movement. In addition to the gas charge 268, a second spring (not shown) may be included to act between the piston 230 and the intermediate piston 267. The spring 262 and the gas charge 268 may also be located on different sides of the intermediate piston 267. The biasing system 260 also includes an intermediate piston 267 biased by the spring 262 compressible between the intermediate piston 267 and the support 213. Optionally, the support 213 includes an orifice 266. As with the biasing system 250, the orifice 166 restricts fluid flow across the support 213 and is open to the ambient pressure to allow for pressure compensation. The orifice 266 is optional though and need not be included.

Upon the occurrence of a sufficient pressure surge, pressure in the dampener fluid flow path 212 moves the piston 230 from an initial position to an expanded position, compressing the gas charge 268 between the piston 230 and the intermediate piston 267, which may cause the intermediate piston 267 to move and compress the spring 262. Compression of the gas charge 268 and the spring 262 resists the movement of the piston 230 to the expanded position. If orifice 266 is included, movement of fluid through the orifice 266 is restricted and thus may also resist the movement of the piston 230. Additionally, ambient pressure acting on the piston 267 through the orifice 266 may restrict movement of the piston 267 and thus the piston 230. Upon relief of the pressure surge, the compressed spring 262 and compressed gas charge 268 expand and, along with any sufficient pressure acting on the piston 230 through the orifice 266, return the piston 230 towards the initial position.

As shown in FIG. 5, another embodiment of a biasing system 270 includes the use of a gas charge 278 sealed between the piston and the support 213 to resist the movement of the piston 230 to an expanded position. The gas charge 278 is compressed as the piston 230 moves toward the support 213, resisting such movement. In addition to the gas charge 278, a spring (not shown) may be included to act between the piston 230 and the support 213.

Upon the occurrence of a sufficient pressure surge, pressure in the dampener fluid flow path 212 moves the piston 230 from an initial position to an expanded position, compressing the gas charge 278 between the piston 230 and the support 213. Compression of the gas charge 278 resists the movement of the piston 230 to the expanded position and upon relief of the pressure surge, the compressed gas charge 278 expands and returns the piston 230 towards the initial position.

In addition to or in alternative to the components discussed in FIGS. 4 and 5, the fluid system 100 may include one or more other components without departing from the scope of the present disclosure. For example, although shown individually, the embodiments of the biasing systems may be combined serially or alternatively, components of each biasing system may be remote from each other but in fluid communication.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A subsea drilling system with a subsea component controllable by a fluid supply source, the system comprising:
   a pressure dampener in fluid communication between the fluid supply source and the subsea component, the pressure dampener comprising:
      a body comprising a dampener fluid flow path comprising a volume; and
      a biasing system comprising a plurality of pistons, each in fluid communication in parallel with the dampener fluid flow path, and biased to an initial position;
      wherein the pistons are configured to move from the initial position to expand the volume of the dampener fluid flow path and dampen a pressure surge received by the pressure dampener;
      wherein the biasing system is configured to contract the volume of the dampener fluid flow path by returning the pistons toward the initial position after dampening the pressure surge; and
      wherein the pressure dampener is teed between the fluid supply source and the subsea component with the dampener fluid flow path inlet also being the outlet.

2. The system of claim 1, wherein the pressure dampener is installed in-line between the fluid supply source and the subsea component with the dampener fluid flow path comprising an inlet and a separate outlet.

3. The system of claim 1, wherein the biasing system comprises a spring configured to bias at least one of the pistons to the initial position.

4. The system of claim 1, wherein the biasing system comprises an orifice open to ambient pressure such that the ambient pressure is configured to bias at least one of the pistons to the initial position.

5. The system of claim 1, wherein the biasing system comprises a gas charge configured to bias at least one of the pistons to the initial position.

6. The system of claim 1, wherein the biasing system further comprises an intermediate piston in fluid communication in series with at least one of the pistons and with the dampener fluid flow path.

7. The system of claim 6, wherein the biasing system comprises a spring and a gas charge.

8. The system of claim 1, wherein the biasing system comprises a cartridge attachable to the body.

9. The system of claim 1, further comprising a baffle in the dampener fluid flow path comprising passages therethrough and configured to restrain fluid flow through the dampener fluid flow path.

10. The system of claim 1, wherein the biasing system comprises more than one spring configured to bias at least one of the pistons to the initial position.

11. The system of claim 10, wherein at least two springs are nested.

12. The system of claim 1, wherein the subsea component comprises a blowout preventer.

13. A pressure dampener for dampening a pressure surge, comprising:
   a body comprising a dampener fluid flow path comprising a volume and an inlet also being an outlet; and
   a biasing system comprising a plurality of pistons, each in fluid communication in parallel with the dampener fluid flow path, and biased to an initial position;
   wherein the pistons are configured to move from the initial position to expand the volume of the dampener fluid flow path and dampen the pressure surge received by the pressure dampener; and
   wherein the biasing system is configured to contract the volume of the dampener fluid flow path by returning the pistons toward the initial position after dampening the pressure surge.

14. The dampener of claim 13, wherein the biasing system comprises a spring configured to bias at least one of the pistons to the initial position.

15. The dampener of claim 13, wherein the biasing system comprises an orifice open to ambient pressure such that the ambient pressure is configured to bias at least one of the pistons to the initial position.

16. The dampener of claim 13, wherein the biasing system comprises a gas charge configured to bias at least one of the pistons to the initial position.

17. The dampener of claim 13, wherein the biasing system further comprises an intermediate piston in fluid communication in series with at least one of the pistons and with the dampener fluid flow path.

18. The dampener of claim 17, wherein the biasing system comprises a spring and a gas charge.

19. The dampener of claim 13, wherein the biasing system comprises a cartridge attachable to the body.

20. The dampener of claim 13, further comprising a baffle in the dampener fluid flow path comprising passages therethrough and configured to restrain fluid flow through the dampener fluid flow path.

21. The dampener of claim 13, wherein the biasing system comprises more than one spring configured to bias at least one of the pistons to the initial position.

22. The dampener of claim 21, wherein at least two springs are nested.

* * * * *